United States Patent
Maratta et al.

(10) Patent No.: US 10,810,367 B2
(45) Date of Patent: Oct. 20, 2020

(54) CONTENT PROCESSING AUTOMATION

(71) Applicant: Disney Enterprises, Inc., Burbank, CA (US)

(72) Inventors: Concetta Maratta, Los Angeles, CA (US); Brian Kennedy, New York, NY (US); Zachary Toback, Montclair, NJ (US); Jared L. Wiener, New York, NY (US); Fabian Westerwelle, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 191 days.

(21) Appl. No.: 16/189,934

(22) Filed: Nov. 13, 2018

(65) Prior Publication Data

US 2020/0151245 A1   May 14, 2020

(51) Int. Cl.
  *G06F 40/205* (2020.01)
  *G06F 16/908* (2019.01)
  (Continued)

(52) U.S. Cl.
  CPC ........... *G06F 40/205* (2020.01); *G06F 16/45* (2019.01); *G06F 16/483* (2019.01); *G06F 16/65* (2019.01);
  (Continued)

(58) Field of Classification Search
  CPC ......... G06F 16/40; G06F 16/41; G06F 16/45; G06F 16/483; G06F 16/50; G06F 16/583;
  (Continued)

(56) References Cited

U.S. PATENT DOCUMENTS

| | | | |
|---|---|---|---|
| 6,108,619 A | * | 8/2000 | Carter .................... G06F 40/268 704/9 |
| 8,098,976 B1 | * | 1/2012 | Acharya ............ H04N 21/8456 386/241 |

(Continued)

OTHER PUBLICATIONS

"AP ENPS." AP ENPS News Production System, www.ap.org/enps/. pp. 1.

(Continued)

*Primary Examiner* — Eric Yen
(74) *Attorney, Agent, or Firm* — Farjami & Farjami LLP

(57) ABSTRACT

In one implementation, a content processing system includes a computing platform having a hardware processor and a system memory storing a content classification software code, a natural language processor, and a computer vision analyzer. The hardware processor executes the content classification software code to receive content inputs from multiple content sources, and, for each content input, to parse the content input for metadata describing the content input, obtain a description of language-based content included in the content input from the natural language processor, and obtain a description of visual content included in the content input from the computer vision analyzer. The content classification software code further associates predetermined annotation tags with the content input based on the metadata, the description of the language-based content, and the description of the visual content, and assigns the content input to a predetermined subject matter classification based on the associated annotation tags.

20 Claims, 4 Drawing Sheets

(51) Int. Cl.
*G06N 3/02* (2006.01)
*G06N 20/00* (2019.01)
*G06F 40/169* (2020.01)
*G06F 40/263* (2020.01)
*G06F 16/45* (2019.01)
*G06F 16/783* (2019.01)
*G06F 16/483* (2019.01)
*G06F 16/65* (2019.01)
*G06F 16/683* (2019.01)
*G06F 16/75* (2019.01)
*G06F 40/30* (2020.01)

(52) U.S. Cl.
CPC ............ *G06F 16/683* (2019.01); *G06F 16/75* (2019.01); *G06F 16/783* (2019.01); *G06F 16/908* (2019.01); *G06F 40/169* (2020.01); *G06F 40/263* (2020.01); *G06F 40/30* (2020.01); *G06N 3/02* (2013.01); *G06N 20/00* (2019.01)

(58) Field of Classification Search
CPC ........ G06F 16/60; G06F 16/65; G06F 16/683; G06F 16/70; G06F 16/75; G06F 16/783; G06F 16/7834; G06F 16/7837; G06F 16/784; G06F 16/7844; G06F 16/906; G06F 16/908; G06F 40/268; G06F 40/30; G06F 40/35
See application file for complete search history.

(56) References Cited

U.S. PATENT DOCUMENTS

| | | | | |
|---|---|---|---|---|
| 8,612,211 | B1* | 12/2013 | Shires | G10L 21/10 704/9 |
| 8,819,024 | B1* | 8/2014 | Toderici | G06F 16/36 707/740 |
| 9,025,811 | B1* | 5/2015 | Ioffe | G06F 16/5838 382/100 |
| 9,331,973 | B1* | 5/2016 | Kristinsson | G06F 16/35 |
| 9,615,136 | B1* | 4/2017 | Emery | G06F 16/54 |
| 9,633,018 | B2* | 4/2017 | Baecke | G06F 16/48 |
| 2007/0094251 | A1* | 4/2007 | Lu | G06F 16/35 |
| 2008/0124042 | A1* | 5/2008 | Divakaran | G10L 25/48 386/241 |
| 2008/0235589 | A1* | 9/2008 | Shaw | G06F 16/4387 715/723 |
| 2009/0100036 | A1* | 4/2009 | Bedrax-Weiss | G06F 16/353 |
| 2010/0161441 | A1* | 6/2010 | Hounsell | G06Q 30/0601 705/26.1 |
| 2010/0312608 | A1* | 12/2010 | Shan | G06Q 30/0255 705/14.54 |
| 2012/0123978 | A1* | 5/2012 | Toderice | G06K 9/6292 706/12 |
| 2013/0060784 | A1* | 3/2013 | Acharya | G06F 16/7844 707/748 |
| 2013/0325865 | A1* | 12/2013 | Georgakis | G06F 16/48 707/737 |
| 2014/0044307 | A1* | 2/2014 | Kenagy | G06F 40/56 382/103 |
| 2014/0108423 | A1* | 4/2014 | Casella dos Santos | G06F 16/285 707/748 |
| 2014/0212106 | A1* | 7/2014 | Izo | H04N 21/44008 386/240 |
| 2014/0218461 | A1* | 8/2014 | Deland | G06Q 10/10 348/14.07 |
| 2014/0325335 | A1* | 10/2014 | Paulik | G06F 16/685 715/234 |
| 2015/0100578 | A1* | 4/2015 | Rosen | G06F 16/9554 707/737 |
| 2016/0378749 | A1* | 12/2016 | Lee | G06F 16/433 707/731 |
| 2019/0065554 | A1* | 2/2019 | Wisehart, Jr. | G06F 16/24568 |
| 2019/0317972 | A1* | 10/2019 | Patton | G06F 16/9535 |
| 2020/0030568 | A1* | 1/2020 | Zola | G06F 16/55 |
| 2020/0104869 | A1* | 4/2020 | Oh | G06F 16/90324 |

OTHER PUBLICATIONS

*Slack Help Center*, get.slack.help/hc/en-us. pp. 1.
"IBM Watson Explorer—Overview." *The Analytics Maturity Model (IT Best Kept Secret Is Optimization)*, IBM Corporation, www.ibm.com/products/watson-explorer. pp. 1.
"Collaboration Software Solutions by Jive Software." *Jive Software*, www.jivesoftware.com/. pp. 1.
"Wolftech News." *Wolftech Broadcast Solutions AS | Wolftech News*, wolftech.no/news.php. pp. 1.

* cited by examiner

CONTENT PROCESSING AUTOMATION

BACKGROUND

The timely distribution of news or other information describing dynamic or highly complex events often requires contributions from a geographically dispersed team of journalists, as well as sometimes remote experts having specialized knowledge and/or uniquely relevant experience. Although tools for enabling collaboration exist, those conventional tools are typically optimized for a particular project, e.g., a specific news broadcast or story, or for a specific content distribution platform. There remains a need in the art for a collaboration solution enabling the real-time, accurate, and consistent distribution of information provided by multiple contributors and/or content sources, across a variety of communications platforms.

SUMMARY

There are provided systems and methods for content processing automation, substantially as shown in and/or described in connection with at least one of the figures, and as set forth more completely in the claims.

DETAILED DESCRIPTION

Figure 1:
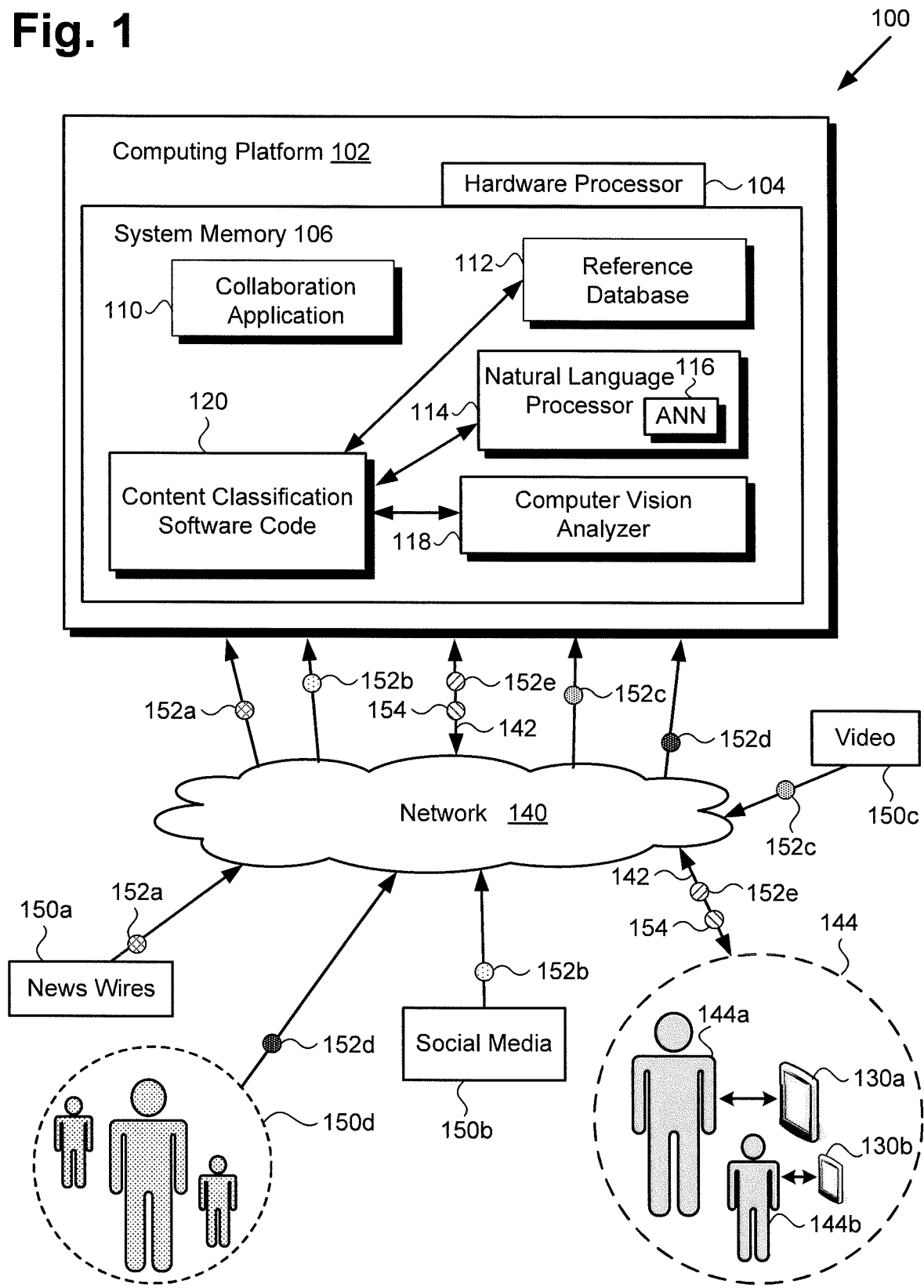
FIG. 1 shows a diagram of a an exemplary content processing system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

It is noted that, as used in the present application, the terms "automation," "automated", and "automating" refer to systems and processes that do not require human intervention. Although, in some implementations, a human editor or annotator may review or even modify a subject matter classification assignment made by the automated systems and according to the automated methods described herein, that human involvement is optional. Thus, the methods described in the present application may be performed under the control of hardware processing components of the disclosed systems.

It is further noted that, as defined in the present application, an artificial neural network, or ANN, is a machine learning engine designed to progressively improve its performance of a specific task. In various implementations, ANNs may be utilized to perform natural-language processing.

FIG. 1 shows a diagram of exemplary content processing system 100, according to one implementation. As shown in FIG. 1, content processing system 100 is utilized within a collaboration environment including communication network 140, system users 144 including exemplary users 144a and 144b, and multiple sources of content including news wires 150a, social media platforms 150b, video source 150c, and crowd source 150d. Also shown in FIG. 1 are user device 130a utilized by user 144a, user device 130b utilized by user 144b, news feed 152a provided by news wires 150a, social media content 152b provided by social media platforms 150b, video content 152c provided by video source 150c, and crowd sourced content 152d provided by crowd source 150d.

Content processing system 100 includes computing platform 102 having hardware processor 104, and system memory 106 implemented as a non-transitory storage device. As further shown in FIG. 1, system memory 106 may store collaboration application 110, reference database 112, natural language processor 114 including ANN 116, computer vision analyzer 118, and content classification software code 120. In addition, FIG. 1 shows network communication links 142 interactively connecting user devices 130a and 130b with computing platform 102 via communication network 140, content input or inputs 152e (hereinafter "content input(s) 152e") provided by one or more of users 144a and 144b, and information 154 received by one or more of users 144a and 144b.

It is noted that, although the present application refers to collaboration application 110, reference database 112, natural language processor 114 including ANN 116, computer vision analyzer 118, and content classification software code 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts collaboration application 110, reference database 112, natural language processor 114 including ANN 116, computer vision analyzer 118, and content classification software code 120 as being mutually co-located in system memory 106, that representation is also merely provided as an aid to conceptual clarity. More generally, content processing system 100 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within content processing system 100. Thus, it is to be understood that any or all of collaboration application 110, reference database 112, natural language processor 114 including ANN 116, computer vision analyzer 118, and content classification software code 120 may be stored remotely from one another within the distributed memory resources of content processing system 100.

Although each of user devices 130a and 130b is shown as a personal communication device in the form of a smartphone or tablet computer in FIG. 1, that representation is also provided merely as an example. More generally, user devices 130a and 130b may be any suitable mobile or stationary computing device or system remote from computing platform 102, and capable of performing data processing sufficient to provide a user interface, support connections to network 140, and implement the functionality ascribed to user devices 130a and 130b herein. For example, in other implementations, user devices 130a and 130b may take the form of laptop or desktop computers, for example.

According to the implementation shown in FIG. 1, users 144a and 144b may utilize respective user devices 130a and 130b to interact with content processing system 100 over communication network 140, for example to download collaboration application 110 to user devices 130a and 130b, to provide content input(s) 152e to content classification software code 120, and/or to retrieve information 154 from reference database 112. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network.

Content processing system 100 may be utilized in a wide variety of content classification and management applications. Nevertheless, by way of example, the implementation shown in FIG. 1 will be further described with reference to news gathering and editing activities. In such an implementation, content processing system 100 may be utilized as a web-based collaboration resource for news organizations with multiple shows across multiple platforms. In some implementations, content processing system 100 may provide collaboration application 110, which may be downloaded to user devices 130a and 130b as a mobile application having a social media site look and feel, thereby making it familiar and intuitive to users 144a and 144b.

Content processing system 100 breaks down conventional barriers to collaboration by providing one place for all of users 144 to collaborate and share information 154 relevant to story development. For example, content processing system 100 may be developed from the perspective of journalist users 144, rather than a news show production perspective. That is to say, on a given day, user 144a may be a journalist chasing one specific event and researching various angles to find the story. Under those circumstances, user 144a is focused on vetting details about the event of interest and does not want to be distracted by unrelated information.

Content processing system 100 is configured to maintain a single source of editorial information across a newsgathering operation, and to present that information in an effective way for internal collaboration and story generation. Content processing system 100 provides a method for editorial staff worldwide to contribute information as content input(s) 152e, display information 154 including assignments and locations, and improve accuracy of and accessibility to the most current information 154. As a result, content processing system 100 can be used to substantially minimize the time for a news organization to turn around a story, while concurrently enhancing the richness of content being reported.

As a story evolves it is clear who is contributing to the story and for what show or platform. Shows, people, and roles may be assigned so that the entire news organization knows who is doing what. Updates are chronological and can be tagged so that journalist users among users 144 can quickly assess what's reportable and what isn't. Show producer users among users 144 can monitor the progress of a given story and assign tasks or follow-ups as necessary.

Because content processing system 100 is configured to be story focused and not show or platform focused, it aligns with the way journalists prefer to work in discovery. When one of users 144 receives information about a news event, the user inputs the information to content processing system 100 as content input(s) 152e, and that information can become associated with that specific news event in reference database 112 for the entire news division to view, comment on, or update. Users 144 can select a story via collaboration application 110 and may see all information associated with that story with one click.

Figure 2:
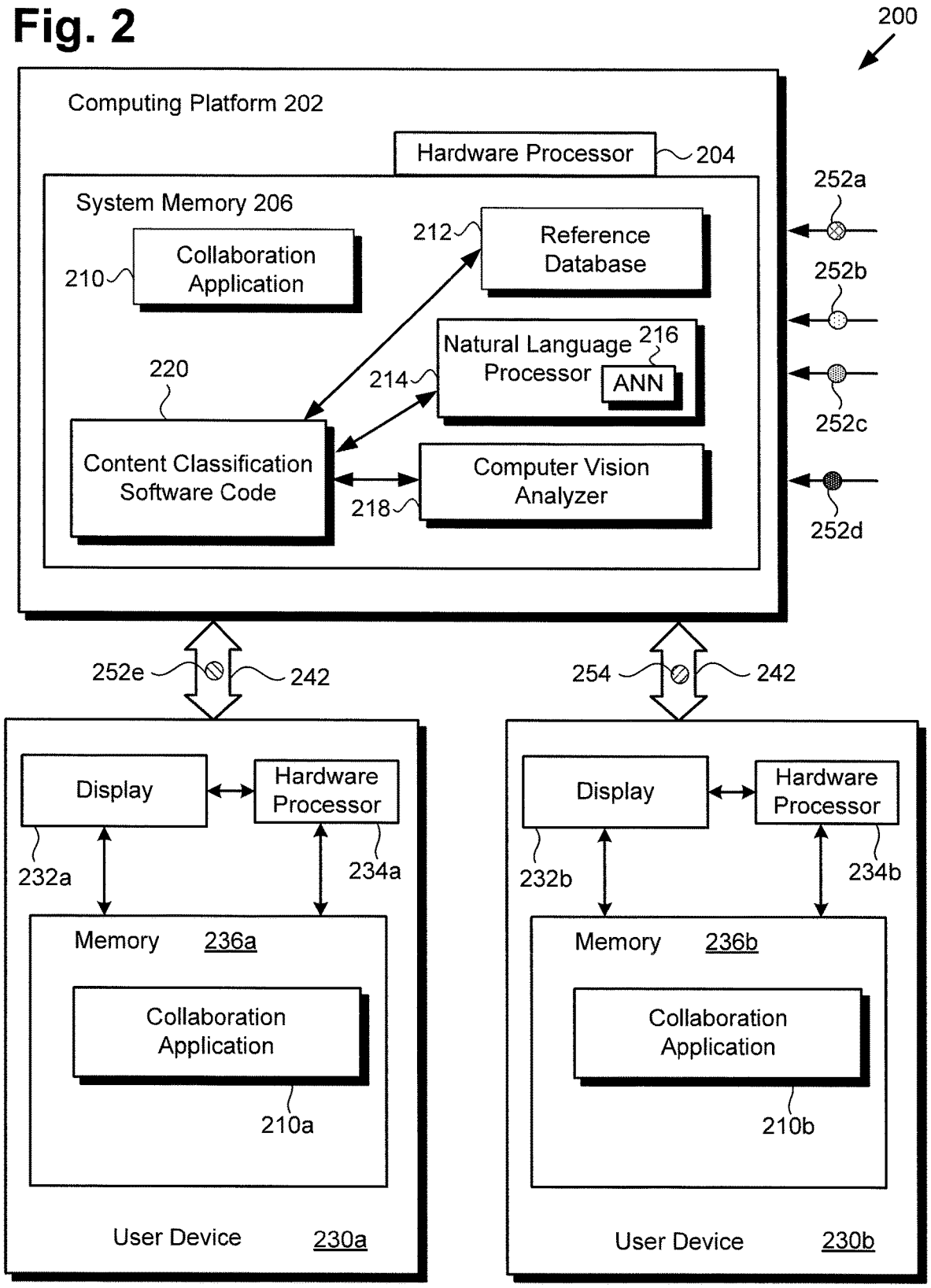
FIG. 2 shows another exemplary implementation of a content processing system.

Referring to FIG. 2, FIG. 2 shows another exemplary implementation of a content processing system as content processing system 200. In addition to content processing system 200, the collaboration environment shown in FIG. 2 includes user devices 230a and 230b interactively connected to content processing system 200 over network communication links 242. Also shown in FIG. 2 are content inputs 252a, 252b, 252c, and 252d received by content processing system 200, content input(s) 252e received by content processing system 200 from user device 230a, and information 254 provided to user device 230b by content processing system 200.

As shown in FIG. 2, content processing system 200 includes computing platform 202 having hardware processor 204, and system memory 206 implemented as a non-transitory storage device. As further shown in FIG. 2, system memory 206 may store collaboration application 210, reference database 212, natural language processor 214 including ANN 216, computer vision analyzer 218, and content classification software code 220. As further shown in FIG. 2, user device 230a includes display 232a, hardware processor 234a, and memory 236a storing collaboration application 210a, while user device 230b includes display 232b, hardware processor 234b, and memory 236b storing collaboration application 210b.

Network communication links 242, information 254, and content inputs 252a, 252b, 252c, 252d, and 252e correspond respectively in general to network communication links 142, information 154, news feed 152a, social media content 152b, video content 152c, crowd sourced content 152d, and content input(s) 152e, in FIG. 1. Moreover, content processing system 200 including computing platform 202 having hardware processor 204 and system memory 206, in FIG. 2, corresponds in general to content processing system 100 including computing platform 102 having hardware processor 104 and system memory 106, in FIG. 1. Thus, content processing system 200 may share any of the characteristics attributed to content processing system 100 by the present disclosure, and vice versa.

In addition, reference database 212, natural language processor 214 including ANN 216, computer vision analyzer 218, and content classification software code 220, in FIG. 2, correspond respectively in general to reference database 112, natural language processor 114 including ANN 116, computer vision analyzer 118, and content classification software code 120, in FIG. 1. In other words, reference database 212, natural language processor 214 including ANN 216, computer vision analyzer 218, and content classification software code 220 may share any of the characteristics attributed to respective reference database 112, natural language processor 114 including ANN 116, computer vision analyzer 118, and content classification software code 120 by the present disclosure, and vice versa.

User devices 230a and 230b correspond in general to respective user devices 130a and 130b, in FIG. 1. Moreover, collaboration application 210/210a/210b, in FIG. 2, corresponds in general to collaboration application 110, in FIG. 1. As a result, user device 230a, user device 230b, and collaboration application 210/210a/210b, may share any of the characteristics attributed to respective user device 130a, user device 130b, and collaboration application 110 by the present disclosure, and vice versa.

According to the exemplary implementation shown in FIG. 2, collaboration application 210a is located in memory 236a of user device 130a/230a and collaboration application 210b is located in memory 236b of user device 130b/230b, collaboration applications 210a and 210b having been received from content processing system 100/200 via network communication links 142/242. In one implementation, network communication links 142/242 correspond to transfer of collaboration applications 210a and 210b over a packet-switched network, for example. Once transferred, for instance by being downloaded over network communication links 142/242, collaboration applications 210a and 210b may be persistently stored in respective memories 236a and 236b, and may be executed locally on respective user devices 130a/230a and 130b/230b by respective hardware processors 234a and 234b.

Hardware processors 234a and 234b may be the central processing units (CPUs) for respective user devices 130a/230a and 130b/230b, for example, in which role hardware processors 234a and 234b run the respective operating systems for user devices 130a/230a and 130b/230b, and execute respective collaboration applications 210a and 210b. Displays 232a and 232b may take the form of liquid crystal displays (LCDs), light-emitting diode (LED) displays, organic light-emitting diode (OLED) displays, or any suitable display screens that perform a physical transformation of signals to light.

In the exemplary implementation represented in FIG. 2, users 144a and 144b of respective user devices 130a/230a and 130b/230b can utilize respective collaboration applications 210a and 210b to send content input(s) 152e/252e to content processing system 100/200 and/or to receive information 154/254 from content processing system 100/200, via network communication links 142/242. For example, in an exemplary implementation in which users 144a and 144b are collaborating on developing a news story, content input(s) 152e/252e may be a journalistic or expert analysis contributed by user 144a. Furthermore, content inputs 252a, 252b 252c, and 252d may be contributions to a knowledge base of the developing news story stored in reference database 112/212. In that use case, information 154/254 may be an update to the collaborative news story based on any or all of content inputs 252a, 252b, 252c, 252d, and 252e.

Figure 3:
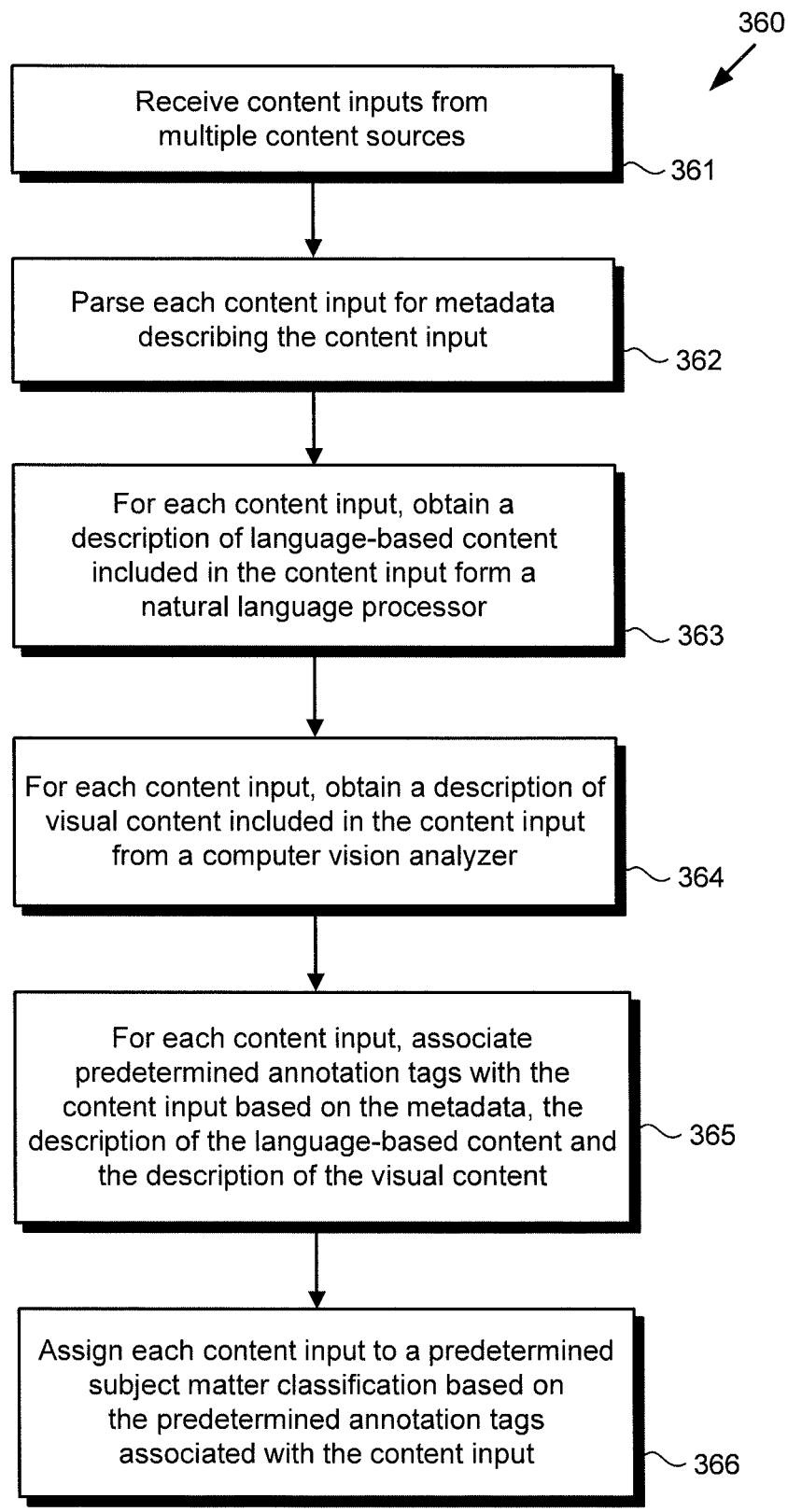
FIG. 3 is a flowchart presenting an exemplary method for use by a content processing system, according to one implementation.

The functionality of content classification software code 120/220 will be further described by reference to FIG. 3 in combination with FIGS. 1, 2, and 4. FIG. 3 shows flowchart 360 presenting an exemplary method for use by content processing system 100/200, according to one implementation. With respect to the method outlined in FIG. 3, it is noted that certain details and features have been left out of flowchart 360 in order not to obscure the discussion of the inventive features in the present application.

Figure 4:
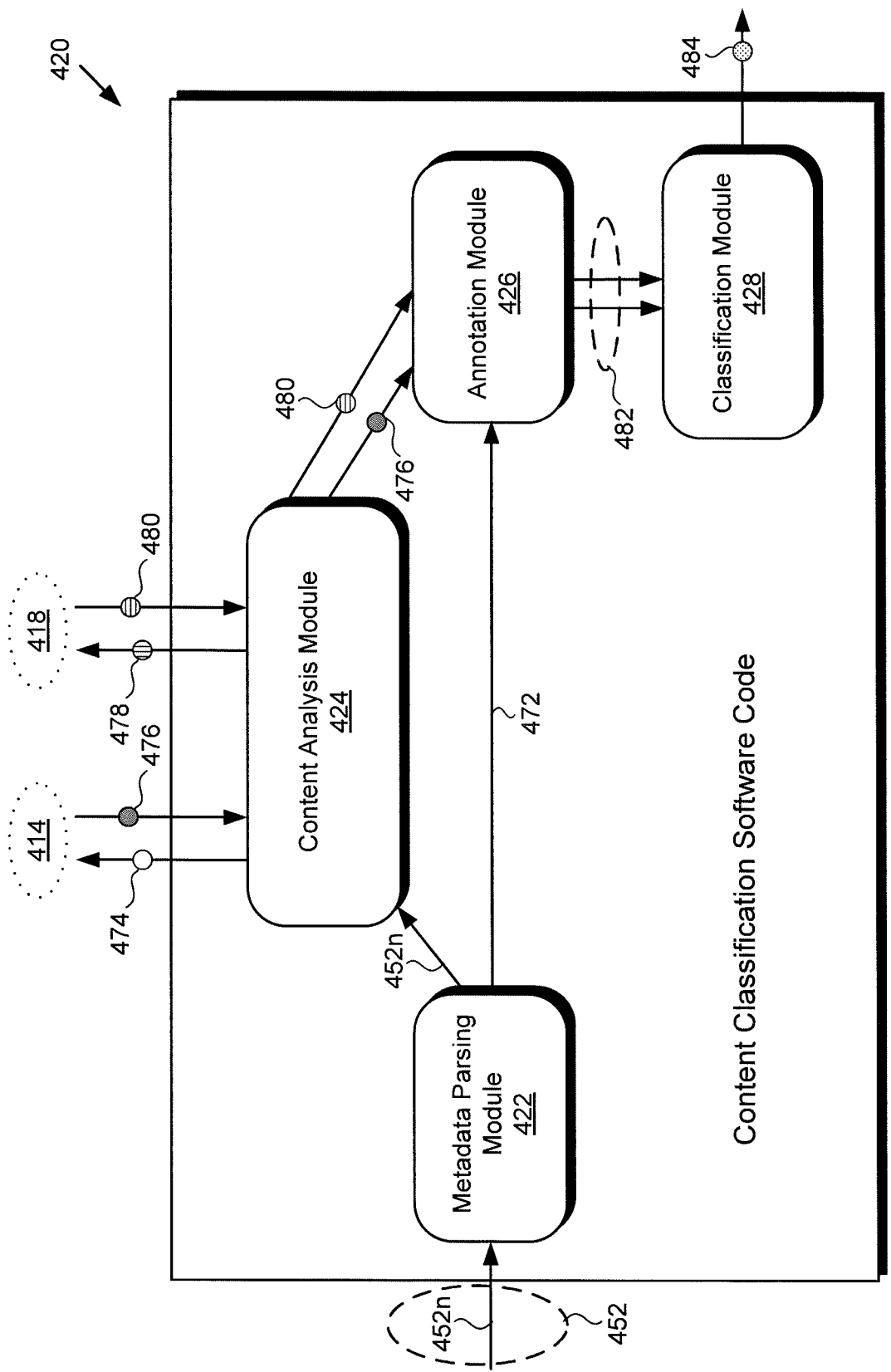
FIG. 4 shows an exemplary diagram of a content classification software code suitable for execution by a hardware processor of the systems shown by FIGS. 1 and 2, according to one implementation.

FIG. 4 shows exemplary content classification software code 420 suitable for execution by hardware processor 104/204 of computing platform 102/202, according to one implementation. As shown in FIG. 4, content classification software code 420 may include metadata parsing module 422, content analysis module 424, annotation module 426, and classification module 428. In addition, FIG. 4 shows content inputs 452 including exemplary content input 452n, metadata 472, language-based content 474 transferred to natural language processor 414 for interpretation, and visual content 478 transferred to computer vision analyzer 418 for interpretation. Also shown in FIG. 4 are description 476 of language-based content 474 obtained from natural language processor 414, description 480 of visual content 478 obtained from computer vision analyzer 418, predetermined annotation tags 482 assigned to content input 452n, and subject matter classification 484 to which content input 452n is assigned by content classification software code 420.

Natural language processor 414, computer vision analyzer 418, and content inputs 452 correspond respectively in general to natural language processor 114/214, computer vision analyzer 118/218, and any or all of content inputs 252a, 252b 252c, 252d, and 252e, in FIG. 2. In other words, like natural language processor 114/214, natural language processor 414 may include a feature corresponding to ANN 116/216. Moreover, content input 452n corresponds to any one of content inputs 252a, 252b 252c, 252d, and 252e.

Content classification software code 420 corresponds in general to content classification software code 120/220, in FIGS. 1 and 2, and those corresponding features may share the characteristics attributed to any of the corresponding features by the present disclosure. That is to say, like content classification software code 420, content classification software code 120/220 may include modules corresponding to exemplary metadata parsing module 422, content analysis module 424, annotation module 426, and classification module 428.

Referring now to FIG. 3 in combination with FIGS. 1, 2, and 4, flowchart 360 begins with receiving multiple content inputs 452 from multiple content sources (action 361). For example, as shown in FIG. 1, multiple content inputs 452 may include news feed content input 152a/252a provided by or obtained from news wires 150a. In addition, or alternatively, content inputs 452 may include social media content input 152b/252b provided by or obtained from social media platforms 150b. In addition, or alternatively, content inputs 452 may include video content input 152c/252c provided by or obtained from video source 150c/150d, and/or crowd sourced content input 152d/252d provided by or obtained from crowd source 150d. Content inputs 452 may be received from any or all of news wires 150a, social media platforms 150b, video source 150c, crowd source 150d, and users 144 by content classification software code 120/220/420, executed by hardware processor 104/204.

Content inputs 452 may also include content input(s) 152e/252e received from one or both of collaboration applications 210a and 210b due to contributions to the collaborative project by respective users 144a and 144b. For example, user 144a and/or 144b may change the knowledge base of the collaborative project by adding information, deleting misinformation, or revising existing information about the collaborative project, using respective collaboration applications 220a and 220b.

It is noted that, due to the collaboration of users 144 on a shared project, content input(s) 152e/252e are likely to be relevant to that collaboration. However, the content provided by or obtained from news wires 150a, social media platforms 150b, video source 150c, and/or crowd source 150d may or may not be relevant to the collaborative project of users 144. Thus, news feed content input 152a/252a may include information on a variety of different subjects other than the subject matter on which users 144 are collaborating. By analogy, each of social media content input 152b/252b, video content input 152c/252c, and crowd sourced content input 152d/252d may be relevant to a variety of different subjects other than the collaborative subject matter.

Flowchart 360 continues with parsing each of content inputs 452 for metadata describing the content input (action 362). Referring specifically to exemplary content input 452n included among content inputs 452, content input 452n may include metadata 472 describing content input 452n. Metadata 472 may include a time stamp and/or date stamp corresponding to generation of content input 452n, as well as one or more keywords or other data describing content input 452n. In addition, or alternatively, metadata 472 may identify the source of content input 452n. Parsing of content input 452n for metadata 472 describing content input 452n may be performed by content classification software code 120/220/420, executed by hardware processor 104/204, and using metadata parsing module 422.

As noted above, one advantage conferred by content processing system 100 is that journalist users among users 144, including editors, can quickly assess what's reportable and what isn't. In some implementations, that assessment may be made based on metadata 472 describing content input 452n. For example, metadata 472 may identify organizations and/or news outlets having rights to broadcast or otherwise publish content input 452n. Moreover, in instances in which rights to the publication of content input 452n are held for some communication channels but not others, metadata 472 may include that additional information. As a specific example, where the organization represented by users 144 has television broadcast rights to content input 452n but lacks the right to publish content input 452n online via the Internet, metadata 472 may include that distinction.

Flowchart 360 continues with, for each content input 452n, obtaining description 476 of language-based content 474 included in content input 452n from natural language processor 114/214/414 (action 363). Natural language processor 114/214/414 may include ANN 116/216, for example, trained to interpret language-based content 474. Description 476 of language-based content 474 included in content input 452n may be obtained from natural language processor 114/214/414 by content classification software code 120/220/420, executed by hardware processor 104/204, and using content analysis module 424.

Flowchart 360 continues with, for each content input 452n, obtaining description 480 of visual content 478 included in content input 452n from computer vision analyzer 118/218/418 (action 364). Computer vision analyzer 118/218/418 may be configured to assess and interpret visual content 478 included in content input 452n. Description 480 of visual content 478 included in content input 452n may be obtained from computer vision analyzer 118/218/418 by content classification software code 120/220/420, executed by hardware processor 104/204, and using content analysis module 424.

Flowchart 360 continues with, for each content input 452n, associating predetermined annotation tags 482 with content input 452n based on metadata 472 describing content input 452n, description 476 of language-based content 474 included in content input 452n, and description 480 of visual content 478 included in content input 452n (action 365). In one implementation, predetermined annotation tags 482 may be selected from a finite and well defined set of annotation tags utilized to classify content input 452n for storage in reference database 112/212.

For example, predetermined annotation tags 482 may identify content input 452n by a content designation such as news or entertainment, or may identify or otherwise characterize persons, objects and/or locations shown or described by content input 452n. Association of predetermined annotation tags 482 with content input 452n based on metadata 472, description 476 of language-based content 474, and description 480 of visual content 478 may be performed by content classification software code 120/220/420, executed by hardware processor 104/204, and using annotation module 426.

Flowchart 360 may conclude with, for each content input 452n, assigning content input 452n to a respective predetermined subject matter classification 484 based on predetermined annotation tags 482 associated with content input 452n (action 366). Assignment of content input 452n to predetermined subject matter classification 484 based on predetermined annotation tags 482 maybe performed by content classification software code 120/220/420, executed by hardware processor 104/204, and using classification module 428.

In use cases in which users 144 are journalists and/or expert analysts collaborating on a news story, that news story may serve as subject matter classification 484, or subject matter classification 484 may otherwise correspond to the news story. Thus, in such a use case, all relevant content inputs to news story/subject matter classification 484 from all content sources can be advantageously classified together by automated content processing system 100/200, may be stored in reference database 112/212, and may thereafter be accessed and/or updated by users 144.

For example, where subject matter classification 484 corresponds to a news story, all news content 152a, social media content 152b, video content 152c, crowd sourced content 152d, and content input(s) 152e/252e submitted by users 144 and relevant to the news story can be segregated from content inputs that are not relevant, and may be stored together. Consequently, content processing system 100/200 enables collaborating users 144 to access all information 154/254 relevant to their collaborative project concurrently, from a single source, i.e., reference database 112/212.

It is noted that in the exemplary use case in which subject matter classification 484 corresponds to a news story or other collaborative project of user 144, each of users 144a and 144b may be authorized to access predetermined subject matter classification 484. Moreover, where users 144 are journalists collaborating on a news story, content input(s) 152e/252e submitted by one or both of users 144a and 144b may be journalistic contributions to the news story being worked on in collaboration.

In some implementations, content classification software code 120/220/420, when executed by hardware processor 104/204, may be configured to perform machine learning to further enhance its content classification performance. For example, in one implementation, hardware processor 104/204 may execute content classification software code 120/220/420 to compare content input 452n to other content inputs assigned to the same predetermined subject matter classification 484, and to generate one or more new annotation tags and/or other descriptive metadata based on the comparison, in an automated annotation process.

That is to say, in addition to associating predetermined annotation tags 482 with content input 452n, in some implementations, content classification code 120/220/420 may also generate new annotation tags and may associate the new annotation tags with content input 452n and/or other content inputs commonly assigned to subject matter classification 484. Consequently, content classification code 120/220/420 can track trends and identify connections between content inputs 452 to content processing system 100/200 that would not be trackable or identifiable based on information carried by content inputs 452 alone.

Thus, the present application discloses content processing systems and methods configured to provide a single collaborative tool for use across an entire organization. The content processing solution disclosed in the present application can be used to substantially minimize the time for an organization to ingest, analyze, and distribute content, while concurrently enhancing the richness of that content. When a system user receives or generates information about a collaborative project, the user inputs the information to the content processing system where it can become assigned with that specific collaborative project in an automated process. Thereafter, all other members of the collaboration team can advantageously view, comment on, or further update the content assigned to the collaboration.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content processing system comprising:
    a computing platform including a hardware processor and a system memory;
    the system memory storing a content classification software code, a natural language processor, and a computer vision analyzer;
    the hardware processor configured to execute the content classification software code to:
        receive a plurality of content inputs from a plurality of content sources;
        for a first content input of the plurality of content inputs:
            parse the first content input for metadata describing the first content input;
            obtain, from the natural language processor, a description of a language-based content included in the first content input;
            obtain, from the computer vision analyzer, a description of a visual content included in the first content input;
            associate a plurality of predetermined annotation tags with the first content input based on the metadata, the description of the language-based content, and the description of the visual content; and
            assign the first content input to a predetermined subject matter classification based on the plurality of predetermined annotation tags.

2. The content processing system of claim 1, wherein the hardware processor is further configured to execute the content classification software code to:
    perform a comparison of the first content input to other content inputs of the plurality of content inputs assigned to the predetermined subject matter classification;
    generate a new annotation tag based on the comparison in an automated annotation process; and
    associate the new annotation tag with at least one of the first content input or at least one of the other content inputs.

3. The content processing system of claim 1, wherein the natural language processor comprises an artificial neural network.

4. The content processing system of claim 1, wherein the first content input comprises video content.

5. The content processing system of claim 1, wherein the first content input comprises social media content.

6. The content processing system of claim 1, wherein the first content input comprises crowd sourced content.

7. The content processing system of claim 1, wherein the first content input comprises a news feed, and wherein the predetermined subject matter classification corresponds to a news story.

8. The content processing system of claim 1, wherein at least one of the plurality of content sources is a user of the content processing system authorized to access the predetermined subject matter classification.

9. The content processing system of claim 1, wherein for each of a given content input of the plurality of content inputs other than the first content input, the hardware processor is further configured to execute the content classification software code to:
    parse the given content input for metadata describing the given content input;
    obtain, from the natural language processor, a description of a language-based content included in the given content input;
    obtain, from the computer vision analyzer, a description of a visual content included in the given content input;
    associate a plurality of predetermined annotation tags with the given content input based on the metadata describing the given content input, the description of the language-based content included in the given content input, and the description of the visual content included in the given content input; and
    assign the given content input to a predetermined subject matter classification based on the plurality of predetermined annotation tags associated with the given content input.

10. The content processing system of claim 7, wherein at least one of the plurality of content inputs comprises a journalistic contribution to the news story submitted by a user of the content processing system authorized to access the predetermined subject matter classification.

11. A method for use by a media content annotation system including a computing platform having a hardware processor and a system memory storing a content classification software code, a natural language processor, and a computer vision analyzer, the method comprising:
    receiving, using the hardware processor and the content classification software code, a plurality of content inputs from a plurality of content sources;

for a first content input of the plurality of content inputs:
        parsing the first content input, using the hardware processor and the content classification software code, for metadata describing the first content input;
        obtaining, using the hardware processor and the content classification software code, from the natural language processor, a description of a language-based content included in the first content input;
        obtaining, using the hardware processor and the content classification software code, from the computer vision analyzer, a description of a visual content included in the first content input;
        associating, using the hardware processor and the content classification software code, a plurality of predetermined annotation tags with the first content input based on the metadata, the description of the language-based content, and the description of the visual content; and
        assigning, using the hardware processor and the content classification software code, the first content input to a predetermined subject matter classification based on the plurality of predetermined annotation tags.

12. The method of claim 11, further comprising:
    performing a comparison, using the hardware processor and the content classification software code, of the first content input to other content inputs of the plurality of content inputs assigned to the predetermined subject matter classification;
    generating, using the hardware processor and the content classification software code, a new annotation tag based on the comparison in an automated annotation process; and
    associating, using the hardware processor and the content classification software code, the new annotation tag with at least one of the first content input or at least one of the other content inputs.

13. The method of claim 11, wherein the natural language processor comprises an artificial neural network.

14. The method of claim 11, wherein the first content input comprises video content.

15. The method of claim 11, wherein the first content input comprises social media content.

16. The method of claim 11, wherein the first content input comprises crowd sourced content.

17. The method of claim 11, wherein the first content input comprises a news feed, and wherein the predetermined subject matter classification corresponds to a news story.

18. The method of claim 11, wherein at least one of the plurality of content sources is a user of the content processing system authorized to access the predetermined subject matter classification.

19. The method of claim 11, further comprising:
    for each of a given content input of the plurality of content inputs other than the first content input:
        parsing the given content input for metadata describing the given content input;
        obtaining, from the natural language processor, a description of a language-based content included in the given content input;
        obtaining, from the computer vision analyzer, a description of a visual content included in the given content input;
        associating a plurality of predetermined annotation tags with the given content input based on the metadata describing the given content input, the description of the language-based content included in the given content input, and the description of the visual content included in the given content input; and
        assigning the given content input to a predetermined subject matter classification based on the plurality of predetermined annotation tags associated with the given content input.

20. The method of claim 17, wherein at least one of the plurality of content inputs comprises a journalistic contribution to the news story submitted by a user of the content processing system authorized to access the predetermined subject matter classification.

* * * * *